United States Patent [19]

Mohler

[11] 4,201,951

[45] May 6, 1980

[54] CASCADED PLASMA TUBE ION LASER HAVING SINGLE RESONATOR STRUCTURE

[75] Inventor: Galen E. Mohler, Los Altos, Calif.

[73] Assignee: Lexel Corporation, Palo Alto, Calif.

[21] Appl. No.: 892,742

[22] Filed: Apr. 3, 1978

[51] Int. Cl.$^2$ .............................................. H01S 3/02
[52] U.S. Cl. ............................................. 331/94.5 D
[58] Field of Search .................... 331/94.5 D, 94.5 G; 350/288

[56] References Cited

U.S. PATENT DOCUMENTS

| 3,864,029 | 2/1975 | Mohler | 331/94.5 C X |
| 4,050,034 | 9/1977 | Barry et al. | 331/94.5 G |
| 4,065,731 | 12/1977 | Wang | 331/94.5 G |

Primary Examiner—James W. Davie
Attorney, Agent, or Firm—C. Michael Zimmerman

[57] ABSTRACT

A gas ion laser is described having two separate plasma tube assemblies serially aligned with one another between a single set of optical reflectors, i.e., in a single resonator. Unbalanced stresses on the resonator due to the forces of gravity on the separate plasma tube assemblies are obviated by appropriately locating the mounting structure connecting the resonator to the laser base. Each of the plasma tube assemblies is so connected to the resonator structure that its axial alignment within the same can be adjusted. Moreover, a vernier drive arrangement for adjusting the angular orientation of the optical reflectors relative to one another is provided.

13 Claims, 11 Drawing Figures

U.S. Patent  May, 6, 1980  Sheet 3 of 4  4,201,951

CASCADED PLASMA TUBE ION LASER HAVING SINGLE RESONATOR STRUCTURE

BACKGROUND OF THE INVENTION

The present invention relates to ion lasers and, more particularly, to a gas ion laser having a plurality of series aligned plasma tubes supported within a single resonator structure.

Gas ion lasers produce coherent radiation from an electrical gaseous discharge. The gaseous discharge takes place between a pair of optical reflectors placed in opposition to one another to reflect optical radiation (radiation in the infrared, visible, and/or ultraviolet range of the spectrum) back and forth through a plasma tube assembly having an envelope containing a lasable gaseous medium. The plasma tube is part of an optical cavity extending along the path of the radiation reflected between the optical reflectors (mirrors).

The power output of a laser is dependent, among other things, on the amount of lasable medium in the optical cavity. It has therefore generally been the practice in designing lasers of increased power wattage, i.e., lasers developing more than, say, 5 watts of output power at a selected frequency, to correspondingly increase the size of the plasma tube containing the lasing gas. Typically, operation of such a larger tube results in the generation of sufficient heat in the plasma tube to strain the capabilities of most coolant arrangements. Moreover, the power supply required to operate such a larger plasma tube generally requires a relatively high input power, e.g., 460 volts alternating current.

In view of the above, it has been known to be desirable to divide the volume of the lasing gas between two or more plasma tube assemblies which are axially aligned between a single pair of reflectors, i.e., in a single resonator structure. Radiation generated in the envelope of one tube of such an arrangement passes through the envelope of the other tube as it travels between the optical reflectors. A cascaded tube laser of this type not only can supply an output power level equal to or greater than that which could be expected from each of the individual plasma tubes, it enables differing lasing mediums to be separately enclosed and used in the same laser. Thus, output frequencies characteristic of differing lasing mediums can be obtained from the same laser. Moreover, the cooling requirements for such a laser can be divided between separate cooling systems of the two individual plasma tube assemblies.

While the advantages of such a cascaded tube ion laser have been recognized for some time, there are design problems associated with the same which have prevented their use and implementation except in relatively permanent arrangements. The major problem has to do with the increased length of the light path outside each of the individual plasma tubes which must be provided between the optical mirrors. In this connection, ion lasers include a "resonator structure" designed to hold the optical reflectors rigidly in the orientation relative to one another required to obtain the multiple reflections of the radiation through the lasing medium needed to sustain laser oscillation. The resonator structure also supports the plasma tube assembly appropriately between the mirrors.

Resonator structures are carefully designed to prevent thermal and mechanical stresses from affecting the mirror and tube alignment. U.S. Pat. No. 3,864,029 describes such a resonator structure, including a mounting arrangement for the mirrors.

It will be appreciated that when the length of the optical path is increased, there will be corresponding demands on the tolerances with which the resonator structure must maintain the mirrors in position relative to each other. That is, the increased path length will mean that any slight deviation in the angle of reflection of the radiation from one of the mirrors will be greatly magnified before it reaches the other mirror. However, the increased resonator length which must be provided in order to accommodate more than one plasma tube makes achieving the required tolerances quite difficult. That is, the increased length makes the resonator structure more susceptible to dimensional changes due to thermal or mechanical stresses. In view of this, lasers with cascaded plasma tubes generally have been limited to relatively permanent installations in which a massive base can be included to provide the resistance to thermal and mechanical stresses required to maintain the mirrors and plasma tube assemblies in proper orientation.

SUMMARY OF THE INVENTION

The present invention is a cascaded tube ion laser allowing thermal and mechanical stresses to have little or no practical affect on the proper relationship of the optical reflectors and tubes, while yet being lightweight and portable. A particularly important feature of the laser of the invention is the provision of mounting structure connecting the resonator to a base in a manner minimizing the mechanical stresses imparted to the resonator due to the weight of the plasma tube assemblies. To this end, such mounting structure is secured to the resonator generally at the locations at which the planes containing the centers of gravity of the plasma tubes meet such resonator structure. The weight of the plasma tubes are then balanced relative to the mounting structure to minimize the affect of unbalanced gravity forces on the axial alignment of each of such tubes. This mounting structure location also prevents the uneven weight distribution of weight dye to the use of more than one tube assembly from being carried by the resonator structure.

Most desirably, each of the plasma tubes is individually secured to the resonator structure by support structure which enables the angular orientation of each tube to be adjusted. To this end, the support structure for each tube includes a pair of support holders rigidly securing the same to the resonator structure adjacent its opposite end portions. One of the support holders maintains the tube end portion with which it is associated stationary transversely of the optical axis of the laser, and the other of such support holders enables limited adjustment of the location of its associated tube end portion transversely of the optical axis. Thus, the angular orientation of the tube with respect to the optical axis can be adjusted to align the same as necessary with the path of the reflected radiation.

As another salient feature of the instant invention, structure is included to provide positive and precise adjustment of the orientation of the optical reflectors with respect to the remainder of the resonator structure. This adjustment is required for example, to tune the laser to achieve specific frequencies. It is achieved in the laser of this invention by combining a vernier worm drive with the adjustable mirror mount arrangement described in U.S. Pat. No. 3,864,029. Such a combination provides the sensitivity in adjustment required for tuning a cascaded tube laser while assuring that any particular adjustment will be maintained. In this connection, the relationship of the axes of the worm and worm gear of such an arrangement at an angle to one another locks the gearing and, hence, the separator at any adjusted position.

The invention includes other features which will be described or will become apparent from the following more detailed description of a preferred embodiment.

DETAILED DESCRIPTION OF THE PREFERRED EMBODIMENT

Figure 1:
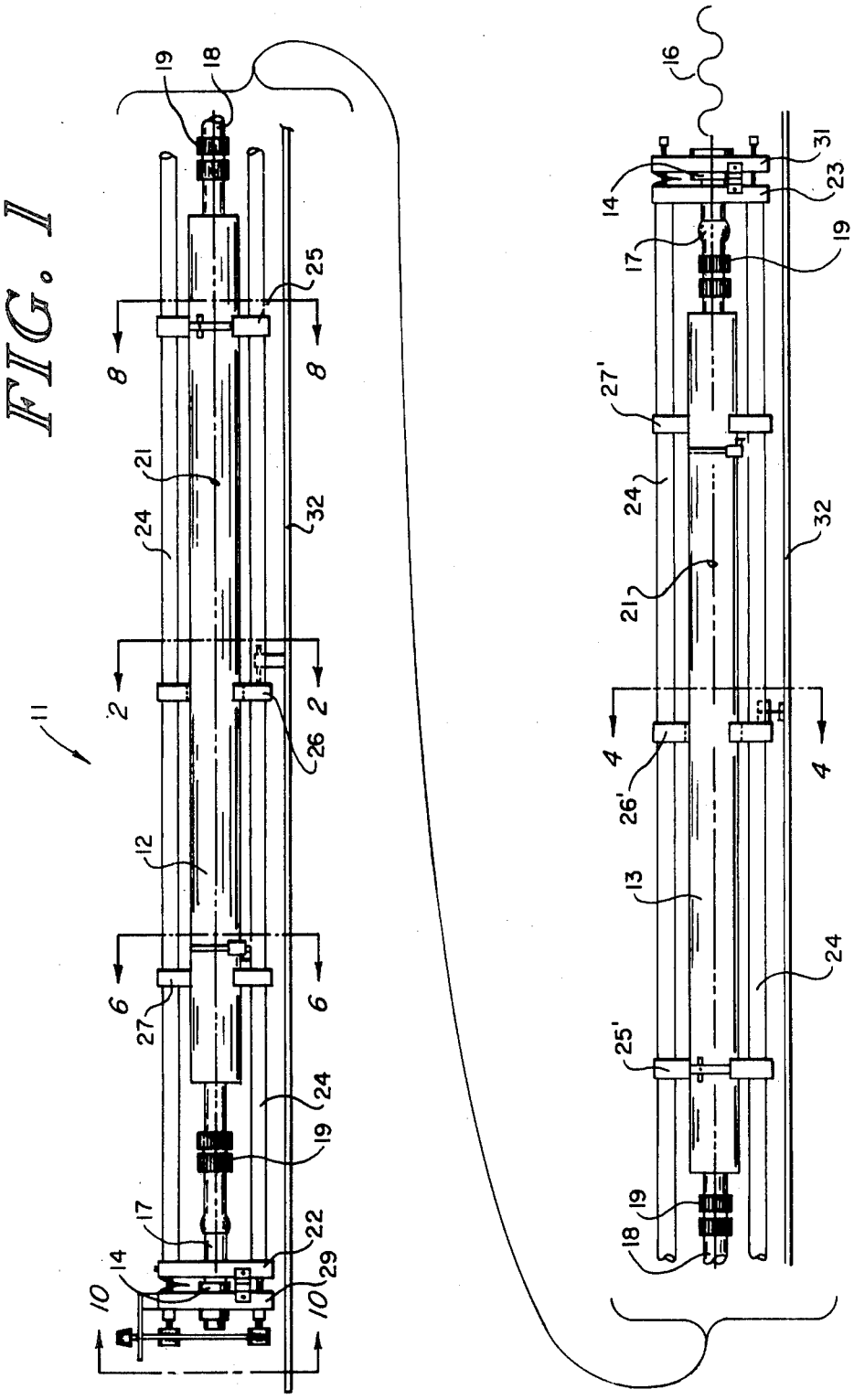
FIG. 1 is a side elevation view of a preferred embodiment of a gas ion laser of the invention, it being shown in two parts on the sheet in view of its length.
Figure 2:
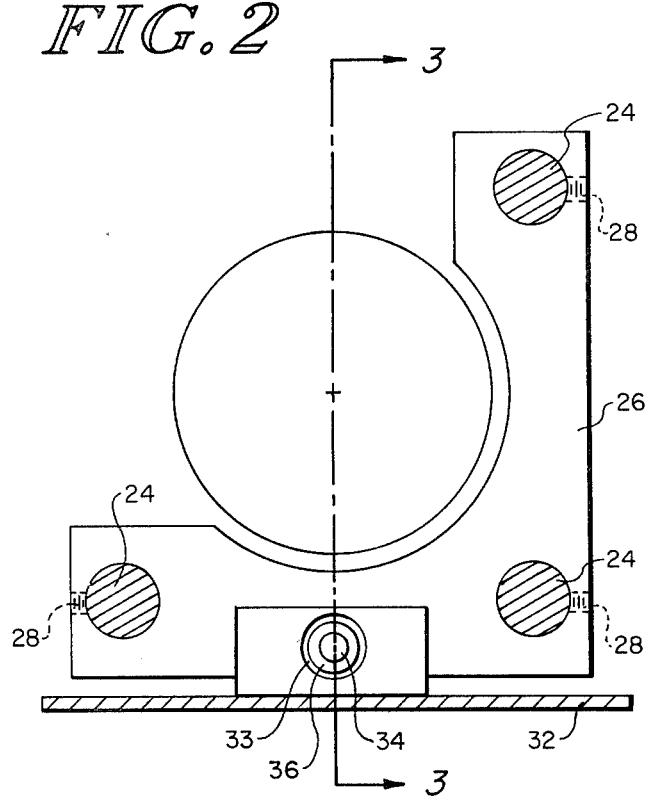
FIG. 2 is an enlarged sectional view taken on the plane indicated by the lines 2—2 in FIG. 1, illustrating structure connecting the resonator of the laser with the laser base.
Figure 3:
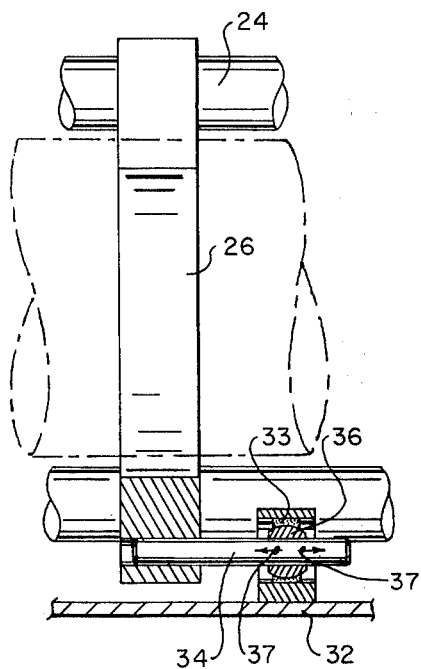
FIG. 3 is an enlarged partial sectional view of the preferred laser embodiment taken generally on a plane indicated by the lines 3—3 in FIG. 2 with the plasma tube shown in phantom for clarity.

A preferred embodiment of a gas ion laser incorporating the present invention is illustrated in FIGS. 1–10 of the drawing. Laser 11 includes a pair of plasma tube assemblies 12 and 13. Each of such assemblies includes not only the envelope (plasma bore tube) which contains the lasing medium, but also the anode and cathode electrodes, the magnet assembly, and coolant structure required to initiate and maintain efficient lasing operation. It will be recognized that each of these assemblies are relatively heavy components of the laser, particularly in view of the inclusion in each of a magnet assembly.

The laser medium will include quantum resonant particles, such as are present in ionized noble gases such as argon or krypton. The gas typically will be at a pressure of about 1 torr within the tube. The lasable medium in each tube can be the same as, or different than, the lasable medium in the other tube. When both tubes have the same lasable medium, the total power output of the laser which can be obtained generally will be equal to or greater than the combined power output of the separate tube assemblies standing alone. When the lasable mediums are different, the laser can be tuned via a wave length selector to provide any output frequency of either of the lasable mediums.

Optical radiation will be propagated along the axes of the tube assemblies 12 and 13, i.e., the axes of their bore tubes, which radiation will pass through Brewster windows at the opposite ends of the assemblies and be reflected by optical reflector assemblies 14 through the bore tubes a sufficient number of times to sustain laser oscillation. Transmission of optical radiation as represented as 16 through one of the reflectors constitutes the coherent optical radiation output of the laser.

The space between the mirrors 14 through which optical radiation or energy is oscillated is referred to as the optical cavity of the laser. Such optical cavity includes the interior of the tube assemblies containing the lasable mediums and is otherwise most desirably enclosed to be maintained dust-free and isolated from the ambient atmosphere in order to reduce optical losses due to reflection and absorption. In this connection, those window ends of each of the tube assemblies positioned adjacent a mirror 14 is communicated therewith by a tubular cover and ball joint arrangement 17 of the type described in my U.S. Pat. No. 3,864,029. The window ends of the tube assemblies which are adjacent one another are connected by a simple tubular cover 18. Each connection between a tube window end and a tubular cover is made by a dual collar arrangement 19 of the type also described in my earlier mentioned patent. The axis 21 of the tube assemblies as extended through the optical cavity is referred to herein as the optical axis of the laser.

Laser 11 further includes resonator structure supporting the tubes 12 and 13 and maintaining the reflectors or mirrors 14 a set distance apart at predetermined relative orientations. In this connection, the resonator is designed to resist dimensional changes due to thermal and mechanical stresses. It includes a pair of square reference members or plates 22 and 23 positioned adjacent opposite ends of the laser optical cavity. Such plates are rigidly held in position relative to one another by a plurality (in this case, three) rods 24, extending therebetween. Such rods are selected to have low thermal expansion in the direction of the laser optical axis over the ambient temperature range to which they are expected to be subjected during operation of the laser. While there are various materials having a low thermal coefficient of expansion suitable for the rods 24, it is preferred that they be of a metal alloy, such as that sold under the trademark "INVAR", which is especially formulated to be dimensionally insensitive to thermal changes.

Rods 24 are spaced apart from one another and generally coextensive, with their ends being rigidly secured to the reference plates to thereby maintain the same in a rigid position. They are connected between three of the four corners of the reference plates to provide three-point relative rigidity between such plates. In this connection, the positioning of the rods at the reference plate corners assures that all parts of the reference plates around the periphery thereof are maintained at the desired relative spacing from one another.

The dimensional relationship of the rods 24 to one another is also maintained along their length by spaced apart support holders 25 and 25', 26 and 26', and 27 and 27'. As can best be seen from FIGS. 2, 4, 6 and 8, each of such support holders is, in effect, a triangular block plate having bore holes receiving the rods 24. Each of the rods is secured within its associated block plate holes by an appropriate adhesive as well as by a set screw 28. The support holders not only maintain the rods 24 in their dimensional relationship at the locations of such holders, but they also add structural strength to the overall resonator structure to resist forces, such as torsion forces, which may cause distortion.

Reference plates 22 and 23 are used to provide a reference base from which the optical reflectors 14 of the lasers are mounted at opposite ends of the optical cavity. In this connection, the assemblies for the reflectors include square mounting plates 29 and 31 positioned parallelly adjacent the respective reference plates 22 and 23. Means are provided connecting each of the mounting plates to its associated reference plate for adjustment of the angular orientation of the mounting plate and, hence, the optical reflector secured thereto, relative to such reference plate. This means takes the form of the tuning bolt separator-leaf spring arrangement described in my previously mentioned U.S. Pat. No. 3,864,029. As brought out in such patent, this connection construction enables the angular orientation of the laser reflectors to be precisely adjusted with respect to the reference plates. It is described in detail in my earlier patent. However, a description of the same will be included hereinafter to the extent appropriate for describing and claiming its combination with one salient aspect of the instant invention.

Laser 11 further includes a base plate 32 extending for its full length supporting the resonator structure. As mentioned previously, cascaded ion lasers, i.e., lasers having two or more plasma tubes serially aligned between a single pair of mirrors, have not been practical, except in situations in which a massive base structure can be provided to support and provide dimensional stability to the laser. It will be recognized that a thin plate base, such as the plate 32, normally would have a tendency to add to the structural instability of the resonator, rather than provide the stability associated with a massive base.

The mounting structure connecting the base plate 32 to the resonator structure isolates the resonator from dimensional changes in the base plate. More particularly, with reference first to FIG. 1, it will be seen that there are only two points of connection between the resonator and the base plate. The number of points of connection are kept to a minimum in order to aid such isolation. Moreover, such connection points adjacent support holders 26 and 26' are themselves designed to enhance such isolation. In this connection, the mounting structure adjacet support holder 26 is shown in detail in FIGS. 2 and 3. It includes a spherical bearing 33 whose race is rigidly secured to the plate 32. A shaft 34 is slidably received within the ball 36 of the bearing, which shaft projects horizontally from the support holder 26. This construction enables differential axis dimensional changes between the base plate and the resonator at the location of the mount to be accommodated by sliding movement of the shaft 34 in the bearing in the direction of arrows 37. Such differential dimensional changes can be expected to be caused by differential thermal expansion. Any geometrical distortion of the base plate is also isolated from the resonator in view of the ability of ball 36 to rotate within its race. This is assuming, of course, that such distortion is not great.

Figure 4:
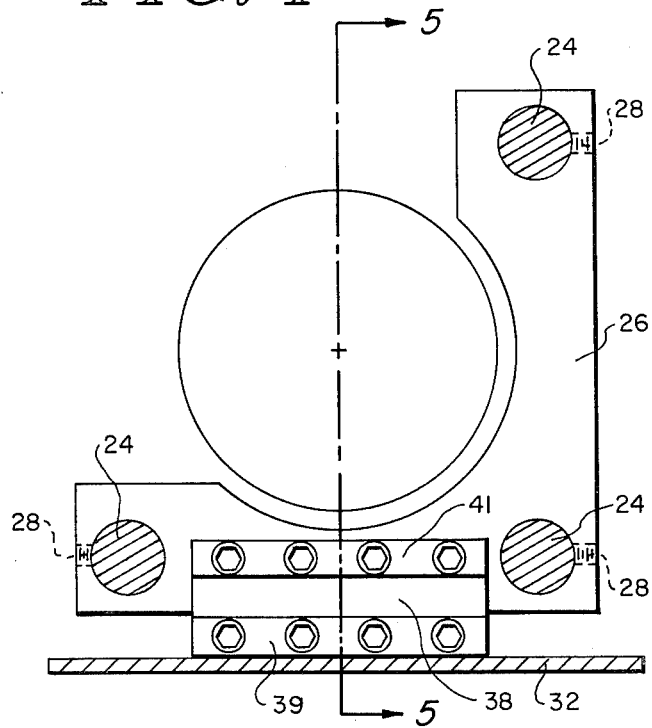
FIG. 4 is an enlarged sectional view taken on a plane indicated by the lines 4—4 in FIG. 1, illustrating another connection between the resonator structure and the base.
Figure 5:
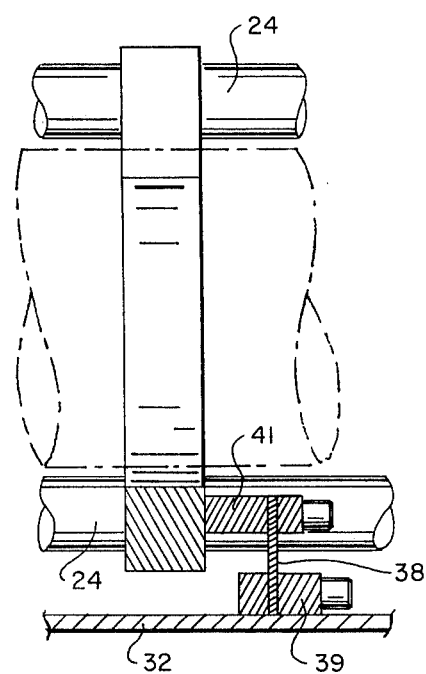
FIG. 5 is an enlarged partial sectional view of the laser taken generally on a plane indicated by the lines 5—5 in FIG. 4 with the plasma tube shown in phantom for clarity.

The mounting structure at support holder 26' is shown in FIGS. 4 and 5. It comprises a flex-plate 38 (a flexible strip of metal) having its lower side edge connected to the base plate 32 via a block arrangement 39 and its upper side edge connected to the support holder 26' via another block arrangement 41. Its construction when combined with the construction of the mounting structure at support holder 26 assures that different thermal expansion between the base and the resonator structure is accommodated, and that the resonator is isolated from limited geometrical distortion of the base.

As a particularly salient feature of the instant invention, the mounting structure connecting the base 32 to the resonator structure is appropriately located to assure that the necessity of supporting the resonator structure does not result in stresses being imparted thereto. That is, as can best be seen from FIG. 1, the support holders 26 and 26' are positioned generally centrally of the plasma tube assemblies 12 and 13. More specifically, each is positioned to be generally in the plane orthogonal to the optical axis 21 containing the center of gravity of the tube assembly with which it is associated. This positioning will assure that the weights of the tube assemblies are balanced relative to the mounting structure so that the affect of any unbalanced gravity forces on the axial alignment of each of the tube assemblies with the optical axis will be minimized. In actual practice, the respective holders 26 and 26' are positioned somewhat closer to the ends of the resonator structure than are the centers of gravities of the two tube assemblies, in order to take into account the weight added to the resonator structure by the optical reflector mounting arrangements mentioned previously.

The support structure which is provided to individually secure each of the plasma tube assemblies 12 and 13 to the resonator is adapted to enable adjustment of the angular orientation of each of such assemblies relative to the laser optical axis. To this end, each of the tube assemblies is supported adjacent its ends by the support holders 25 and 27, and 25' and 27'. In this connection, the support holders 27 and 27' are the same except for being assembled as mirror images, their location and the plasma tube assembly with which each is associated. Support holders 25 and 25' are likewise the same.

Figure 6:
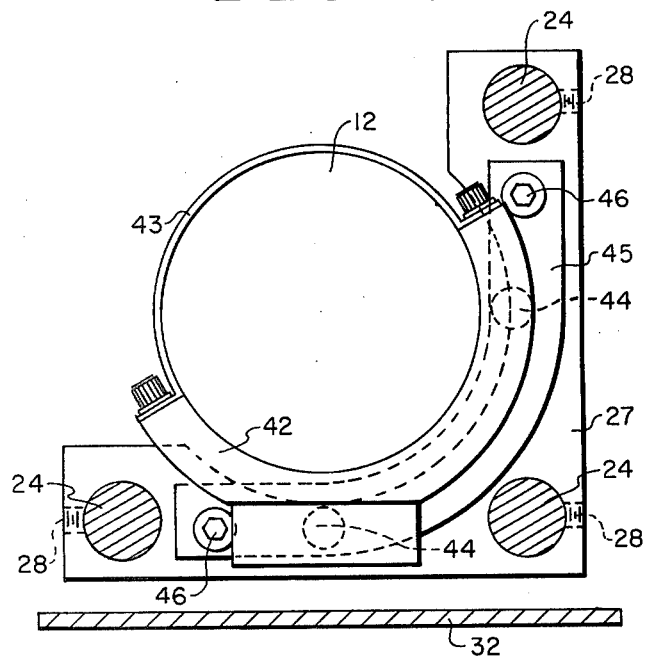
FIG. 6 is an enlarged sectional view taken on a plane indicated by the lines 6—6 in FIG. 1, illustrating the support structure connecting one end of one of the plasma tubes of the laser to the resonator structure.
Figure 7:
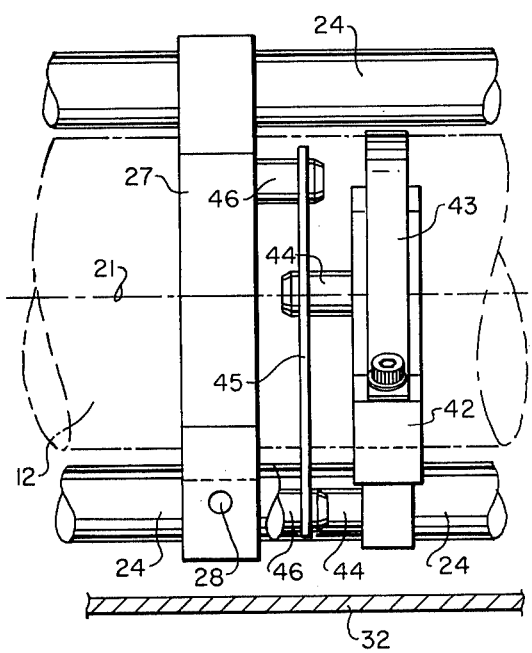
FIG. 7 is an enlarged partial side elevation view of the laser illustrating the support holder of FIG. 6 with the plasma tube shown in phantom for clarity.

Reference is made to FIGS. 6 and 7 for a complete showing of the manner in which tube assembly 12 is secured to support holder 27. The tube assembly is rigidly held by a clamp made up of a semi-cylindrical block 42 and a strap 43. Such clamp is connected to the support holder 27 via an arrangement which permits limited axial movement of the tube assembly relative to such support holder. That is, block 42 is secured via a pair of pins 44 to an arcuate flexible strip 45. Strip 45 is in turn rigidly connected at spaced locations via pins 46 to support holder 27.

The positions at which the pins 44 and 46 are secured to the strip 45 are spaced from one another. Thus, slight movement along the optical axis 21 of the clamp and plasma assembly 12 to which it is secured, relative to the support holder 27 is accommodated. In this connection, the periphery of the cavity within the support holder 27 through which the tube assembly passes is spaced from the tube assembly in order not to interfere with such movement. Thus, the tube assembly is isolated from the support structure 27 to permit limited differential thermal expansion between the two members along the axis 21.

Figure 8:
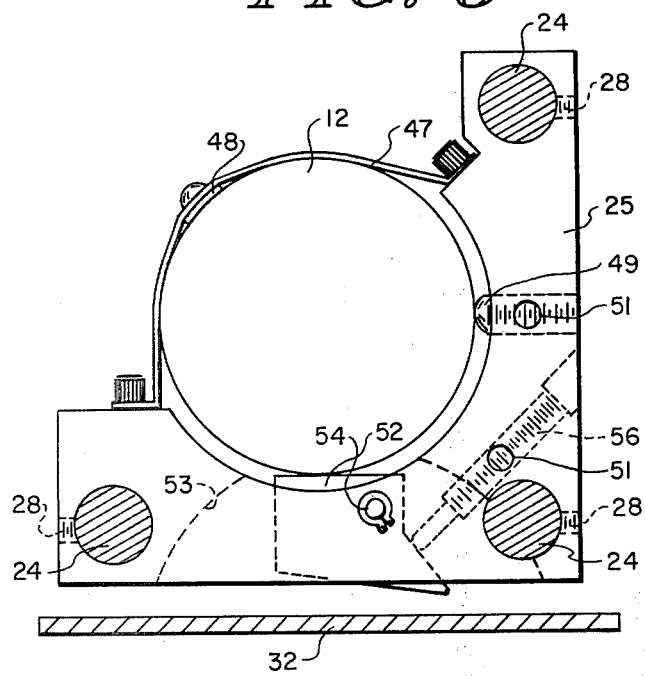
FIG. 8 is an enlarged sectional view taken on a plane indicated by the lines 8—8 in FIG. 1, illustrating the support structure for securing the other end of the one plasma tube to the resonator structure.
Figure 9:
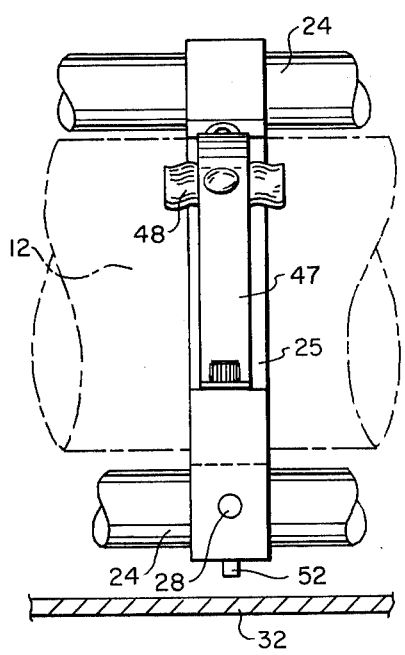
FIG. 9 is an enlarged partial side elevation view of the laser illustrating the support holder of FIG. 8.

It should be noted that although the clamping and flex-strip connection shown in FIGS. 6 and 7 permits limited axial movement of tube assembly 12 relative to the resonator structure, it holds the end portion of the plasma tube assembly with which it is associated stationary in the transverse direction with respect to the optical axis. This particular feature of the support structure is combined with the manner in which the other end portion of the tube assembly is held by the support holder 25 to permit desired adjustment of the angular orientation of the tube assembly relative to optical axis. With reference to FIGS. 8 and 9, it will be seen that the tube assembly 12 is directly secured within the reentrant cavity of the support holder 25 by a strap 47. Strap 47, includes a leaf spring 48 extending transversely thereof bearing against the plasma tube assembly 12.

Tube assembly 12 is prevented from engaging the interior peripheral surface of the cavity by an adjustable spacing arrangement. More particularly, a spacer bolt 49 threadably engaged with the support holder extends horizontally into the cavity to bear against the tube assembly. It defines the distance between the tube assembly and the resonator structure at its location. Rotation of the bolt in its threaded engagement with the support holder changes such distance. A set screw 51 enables any particular adjustment of the bolt 49 to be set.

Support holder 25 further includes a cam 52 which enables the vertical location of the tube assembly relative to the support holder to also be adjusted. Cam 52 is pivotally connected within a cavity 53 defined in the base of the support holder by a pin 54. As illustrated, the upper surface of such cam bears against the tube assembly and thereby defines the distance between the tube assembly and the resonator structure. Means are also included to change the pivotal position of the cam and thereby change the spacing of the tube assembly from the resnator structure at the location of the cam. More particularly, an adjustment bolt 56 is threadably engaged within the support holder with its bearing end engaging a surface of cam 52 on the side of the pivotal connection opposite the surface thereof which bears against the tube assembly. It will be recognized that rotation of adjustment bolt 56 in its threaded engagement with support holder 25 will result in translational movement of the same either inwardly or outwardly of the support holder. Cam 52 will accordingly be pivoted to change the distance with which it maintains the tube assembly 12 from the support holder. Another set screw 51 is provided to set the position of the adjustment bolt 56.

The combination of the cam 52 with the adjustment bolt 56 enables the vertical position of the tube assembly within the support holder to be varied without the necessity of access to the bottom of the resonator structure. That is, such combination converts slanted translational movement of bolt 56 to vertical movement of cam 52.

It will be recognized that by appropriately adjusting the positions of either or both the spacer bolt 49 and the cam 52, the position of the end of tube 12 held by support holder 25 can be changed in any direction transverse to optical axis 21. And because the other end of the tube assembly 12 is maintained stationary transversely with respect to the optical axis, adjustment of the transverse position of the end held by the support holder 25 will result in a desired change in the angular orientation of the whole tube assembly relative to the optical axis.

Since the mounting structure associated with support holders 25' and 27' for the plasma tube assembly 13 is the same as that described with respect to support holders 25 and 27, such adjustment can be made with respect to both of the tube assemblies. It is particularly advantageous that means for such adjustments be provided in a cascaded tube ion laser in view of the greater likelihood, due to the length of the resonator structure, of alignment variations.

Figure 10:
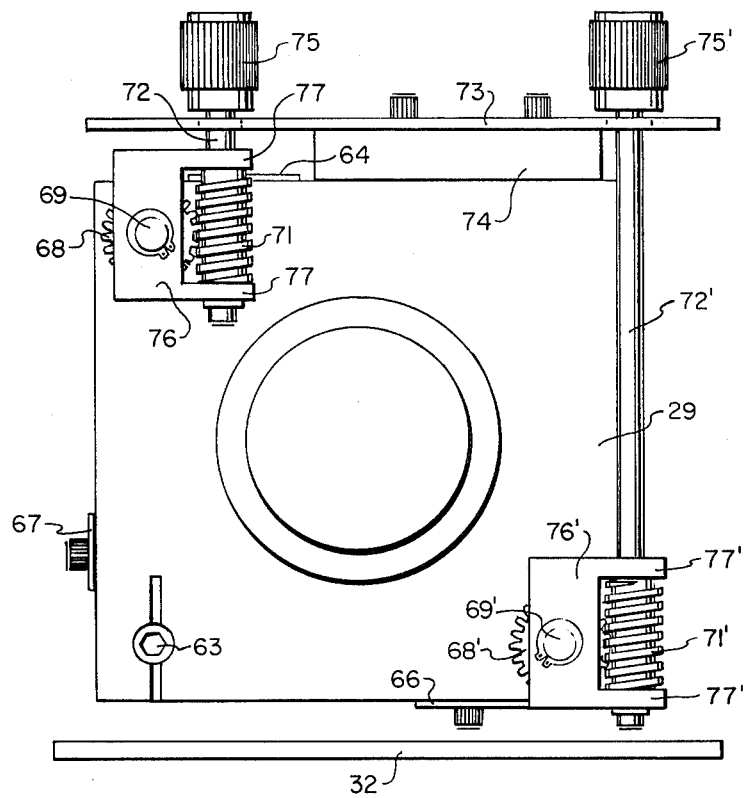
FIG. 10 is an enlarged end elevation view taken on a plane indicated by the lines 10—10 in FIG. 1, illustrating the worm gear drive of the preferred embodiment of the invention for adjusting the location of a mount for the optical reflector relative to the remainder of the resonator structure.
Figure 11:
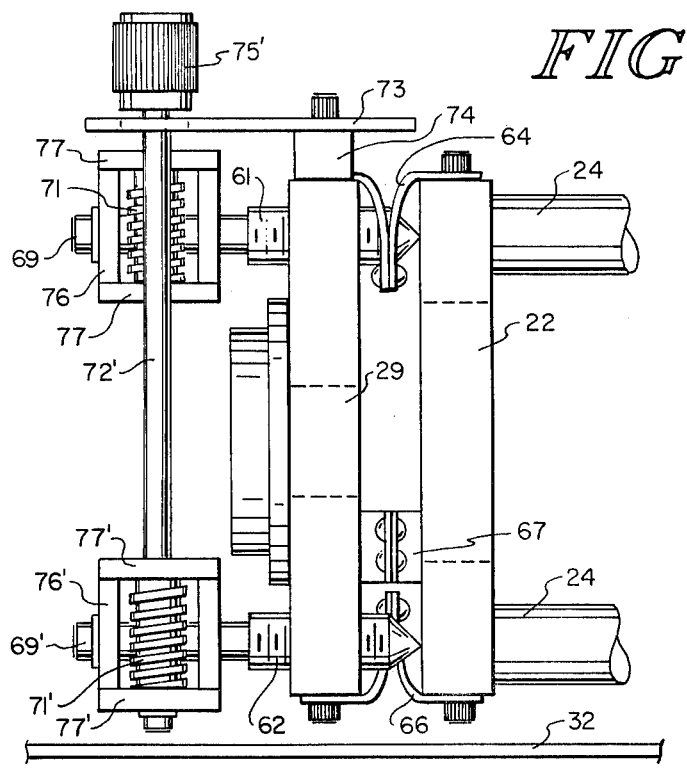
FIG. 11 is an enlarged partial side elevation view of the laser showing in more detail the relationship of the worm gear drive to the remainder of the resonator structure.

As mentioned previously, the invention also combines the tuning separator-leaf spring arrangement described and claimed in my earlier U.S Pat. No. 3,864,029, with a vernier worm drive to enable precise changes in the orientation of one of the mirrors 14 relative to the other to be made. Such combination is illustrated in FIGS. 10 and 11. The connecting structure extending between the mounting plate 29 and the reference plate 22 includes separator bolts 61, 62 and 63 threadably engaged with the mounting plate 29 adjacent three of its corners. Leaf springs 64, 66 and 67 are connected between the reference and mounting plates respectively adjacent the separator bolts 61, 62 and 63 to resiliently urge the plates toward one another by maintaining a compressive force on the separators. While most desirably each of the leaf springs is of the re-entrant type described in my U.S. Pat. No. 3,864,029, from the broad standpoint leaf springs of other configurations could be provided.

It will be seen that with the above construction, rotation of one or more of the separator bolts 61–63 in its threaded engagement with the mounting plate will result in the angular orientation of such mounting plate being adjusted relative to the reference plate. Individual worm gear drives are connected to each of the separators 61 and 62 to provide such adjustment with the precision and sensitivity required for the extended mirror spacing associated with the cascaded ion tube laser of the invention. The worm drive associated with separator bolt 61 includes a worm wheel 68 keyed or otherwise mounted on a shaft extension 69 of the separator for rotation therewith. Worm wheel 68 is threadably engaged by the helical threads of a worm 71 on a drive shaft 72 extending upwardly therefrom. As illustrated, shaft 72 extends through a slot in a support plate 73 secured via a block 74 to the upper edge of mirror mounting plate 29. A manually graspable knob 75 is provided on the free end of shaft 72 to facilitate operation of the worm drive.

Worm 71 is maintained in engagement with worm wheel 68 via a support yoke 76 which is mounted rotatably on shaft 69. That is, shaft 72 is secured for rotation within a pair of ears 77 projecting from that portion of yoke 76 mounted rotatably on the shaft extension 69. It is engagement of the drive shaft 72 with the support plate 73 which prevents the yoke from rotating on the shaft extension 69.

The worm drive associated with separator bolt 62 is the same as that described for the separator bolt 61, except that the shaft on which the worm is provided is made longer to span the distance between the separator 62 and the support plate 73. For this reason, it will not be described in detail. The parts of the same are referred to by primed numerals corresponding to the numerals used in describing the worm drive associated with separator bolt 61.

It will be seen that selective operation of the vernier worm drive associated with the separators 61 and 62 will change the angular orientation of the mounting plate and, hence, the optical reflector mounted thereon, relative to the reference plate. Such changes will be made about differing axes. In this connection, the three connections between the mounting plate and reference plate provided by the three separator bolts are so related that straight lines drawn respectively from the bolts 61 and 62 to the bolt 63 will intersect one another generally at a right angle. Thus, such separators cooperate to provide independent rotational movement of the mounting plate about perpendicular axes to enable orthogonal adjustment. Separator bolt 63 acts, in effect, as a connection between the mount and reference plates which remains stationary during the adjustment of either one or both of the other separator bolts.

The use of a worm drive to provide fine tuning has numerous advantages over previously suggested or used spur gear and belt arrangements. A worm drive can be made to provide a smooth transition between different settings. This is in contrast to spur gear arrangements which inherently have a "chattering" or grinding due to the necessity of teeth meshing. This chattering is evidenced in tuning by incremental tuning changes referred to in the art as "noise". A worm gear can also provide a much more compact vernier arrangement than reduction gearing relying on differently sized gears such as spur gear and belt arrangements. Thus relatively great sensitivity can be achieved with a worm gear without unduly adding to the spatial requirements. In this connection, re-entrant leaf springs such as springs 64, 66 and 67 tend to place a significant compressive force on the separators, thereby requiring a greater angular force than is often required in gas ion lasers to rotate the separators. The worm drive of one embodiment of the laser corresponding to that described was selected to provide a 30:1 reduction in angular rotation. That is, it requires 30 full revolutions of either of the knobs 75 or 75' to cause one full revolution of the separator bolts with which such knobs are respectively associated.

One of the more important advantages associated with incorporating a vernier worm drive into the mirror adjustment mechanism of a gas ion laser is that a worm drive not only provides the desired adjustment, but also acts as a positive lock to prevent unwanted changes in the mirror setting. That is, because the worm and worm wheel of such a drive are on axes that are generally orthogonal to one another, any linear force tending to change such setting, such as tending to change the distance between the mirror mounting and resonator reference plates, will not cause the rotation of the worm drive required for setting changes.

The invention has been described in detail in connection with a preferred embodiment thereof in order to satisfy the patent statutes. It will be recognized by those skilled in the art, though, that various changes and modifications can be made without departing from its spirit. For example, the vernier worm drive feature of the invention may be incorporated, if desired, into a gas ion laser having only a single plasma tube assembly. It is therefore intended that the coverage afforded applicant be limited only by the spirit of the invention as defined by the claims.

I claim:

1. A cascaded ion laser comprising:
   A. resonator structure supporting at opposed, spaced apart locations, means to mount a pair of optical reflectors in opposition to one another to define an optical axis therebetween;
   B. lasing structure supported by said resonator structure defining an elongated optical cavity between said mounting means for said reflectors, which structure includes at least two plasma tube assemblies axially aligned with one another along said optical axis separately enclosing lasable mediums;
   C. a base for said resonator structure; and
   D. mounting structure connecting said base to said resonator structure, which mounting structure is secured to said resonator structure generally at the locations at which the respective planes orthogonal to said optical axis containing the centers of gravity of said two plasma tube assemblies meet said resonator structure, whereby the weight of said envelopes are balanced relative to said mounting structure to minimize the effect of unbalanced gravity forces on the axial alignment of each of said envelopes with said optical axis.

2. A cascaded ion laser according to claim 1 wherein said lasable mediums separately enclosed by said two plasma tube assemblies are generally the same.

3. A cascaded ion laser according to claim 1 wherein said lasable mediums separately enclosed by said two plasma tube assemblies are substantially different whereby lasing is obtainable at a combination of distinct frequencies characteristic of said individual mediums.

4. A cascaded ion laser according to claim 1 wherein at least one of said means to mount a pair of optical reflectors in opposition to one another includes:
   A. a reference member positioned at a predetermined location relative to said optical axis;
   B. a mount for one of said optical reflectors; and
   C. means connecting said mount to said reference member for adjustment of the angular orientation of said mount relative to said reference member, which connecting means includes:
      (1) a first separator extending between said reference member and said mount defining the distance therebetween at the location of said separator, which separator is threadably engaged with one of said mount and said reference member whereby rotation of said separator in said threaded engagement causes the length of said separator located between said reference member and said mount to be varied; and
      (2) a first vernier worm drive connected to said first separator for rotating the same in said threaded engagement to precisely vary said length and then lock said separator in a set position.

5. A cascaded ion laser according to claim 4 wherein there are two of said separators extending between said reference member and said mount at spaced apart locations defining the distance therebetween at their respective locations, each of which separators is threadably engaged with one of said mount and said reference member whereby rotation of the same in said threaded engagement causes the length of the same located between said reference member and mount to be varied; means are provided defining a third connection between said mount and said reference member at a location spaced from the locations of said separators, and a second vernier worm drive is connected to the second separator for rotating the same in its threaded engagement to precisely vary its length, whereby selective operation of said first and second vernier worm drives changes about differing axes said angular orientation of said mount to said reference member.

6. A cascaded ion laser according to claim 5 wherein said means connecting said mount to said reference member includes associated with each of said separators, a leaf spring having opposite ends respectively secured to said reference member and said mount and being in tension therebetween to resiliently urge said reference member and said mount toward one another.

7. A cascaded ion laser according to claim 1 wherein said mounting structure connecting said base to said resonator structure is adapted to accommodate differential thermal expansion between said base and said resonator structure.

8. A cascaded ion laser according to claim 7 wherein said mounting structure connecting said base to said resonator structure is further adapted to isolate said resonator structure from limited geometrical distortion of said base.

9. A cascaded ion laser according to claim 1 wherein support structure individually secures each of said two plasma tube assemblies to said resonator structure, which support structure is adapted to enable adjustment of the angular orientation of each of said plasma tube assemblies relative to said optical axis.

10. A cascaded ion laser according to claim 9 wherein said support structure securing each of said plasma tube assemblies to said resonator structure is adapted to accommodate differential thermal expansion between its associated plasma tube assembly and said resonator structure.

11. A cascaded ion laser according to claim 9 wherein said support structure includes for each of said plasma tube assemblies a pair of support holders rigidly securing the plasma tube assembly to said resonator structure adjacent opposite end portions of said envelope, one of said support holders maintaining the plasma tube assembly end portion with which it is associated stationary in the transverse direction with respect to said optical axis, and the other of said support holders enabling limited adjustment of the location of its associated end portion transversely with respect to said optical axis to provide said angular orientation adjustment.

12. A cascaded ion laser according to claim 11 wherein the support holder associated with each plasma tube assembly providing said adjustment includes a spacer bolt threadably engaged with said resonator structure and bearing against said tube assembly to define the distance between said tube assembly and said resonator structure, whereby rotation of said bolt in said threaded engagement changes said distance.

13. A cascaded ion laser according to claim 12 wherein the support holder associated with each plasma tube assembly providing said adjustment further includes a cam pivotally connected to said resonator structure at a location spaced from the location of said spacer bolt, which cam includes a surface bearing against said assembly to define the distance of said tube assembly from said resonator structure at the location of said cam, and means are provided to change the pivotal position of said cam thereby to change the spacing of said tube assembly from said resonator structure at the location of said cam.

* * * * *